(12) United States Patent
Murillo et al.

(10) Patent No.: US 11,617,379 B2
(45) Date of Patent: Apr. 4, 2023

(54) SEITAN BACON PRODUCT

(71) Applicant: SOCIÉTÉ DES PRODUITS NESTLÉ S.A., Vevey (CH)

(72) Inventors: Robert Murillo, Santa Cruz, CA (US); Kelly Swette, Pebble Beach, CA (US)

(73) Assignee: Societe des Produits Nestle S.A., Vevey (CH)

(*) Notice: Subject to any disclaimer, the term of this patent is extended or adjusted under 35 U.S.C. 154(b) by 141 days.

(21) Appl. No.: 16/871,608

(22) Filed: May 11, 2020

(65) Prior Publication Data
US 2020/0268016 A1 Aug. 27, 2020

Related U.S. Application Data

(60) Continuation of application No. 15/285,246, filed on Oct. 4, 2016, now Pat. No. 11,388,911, which is a division of application No. 14/558,045, filed on Dec. 2, 2014, now abandoned.

(60) Provisional application No. 62/066,090, filed on Oct. 20, 2014.

(51) Int. Cl.
| | |
|---|---|
| A23J 3/22 | (2006.01) |
| A23J 3/18 | (2006.01) |
| A23J 3/14 | (2006.01) |
| A23L 11/00 | (2021.01) |

(52) U.S. Cl.
CPC ............. *A23J 3/227* (2013.01); *A23J 3/14* (2013.01); *A23J 3/18* (2013.01); *A23L 11/05* (2016.08); *A23V 2002/00* (2013.01)

(58) Field of Classification Search
CPC ...... A23J 3/14; A23J 3/18; A23J 3/227; A23L 11/05
USPC .................................................. 426/94, 302
See application file for complete search history.

(56) References Cited

U.S. PATENT DOCUMENTS

| | | | |
|---|---|---|---|
| 3,537,859 A * | 11/1970 | Hamdy | A23L 11/07 426/409 |
| 3,615,656 A * | 10/1971 | Alden | A23J 3/16 426/250 |
| 3,773,525 A * | 11/1973 | Pittet | A23L 27/205 426/537 |
| 3,876,794 A * | 4/1975 | Rennhard | A23G 2200/06 426/548 |
| 3,954,052 A | 5/1976 | Vegh | |
| 4,166,138 A * | 8/1979 | Ziminski | A23J 3/227 426/802 |
| 4,169,161 A | 9/1979 | Leidy | |
| 4,650,681 A | 3/1987 | Greethead | |
| 4,880,654 A | 11/1989 | Okada | |
| 4,961,937 A * | 10/1990 | Rudel | A21D 2/265 426/19 |
| 5,074,200 A | 12/1991 | Ruozi | |
| 5,601,864 A * | 2/1997 | Mitchell | A23L 17/70 426/643 |
| 5,925,400 A * | 7/1999 | Gundlach | A23L 13/60 426/417 |
| 6,013,294 A * | 1/2000 | Bunke | A21D 10/002 426/120 |
| 6,159,529 A | 12/2000 | Uchida et al. | |
| 2003/0108650 A1 | 6/2003 | Kohler et al. | |
| 2003/0175326 A1* | 9/2003 | Thombre | A23K 50/00 424/442 |
| 2004/0033301 A1 | 2/2004 | Kuraoka | |
| 2004/0086598 A1* | 5/2004 | Maegli | A23C 19/093 426/34 |
| 2005/0048172 A1 | 3/2005 | Vattem et al. | |
| 2005/0244564 A1* | 11/2005 | Perlman | A23D 9/00 426/602 |
| 2006/0034995 A1 | 2/2006 | DeSmidt et al. | |
| 2007/0178218 A1* | 8/2007 | Yager | A23L 11/05 426/634 |
| 2008/0014294 A1 | 1/2008 | Kawa et al. | |
| 2008/0226806 A1 | 9/2008 | Sugiyama | |
| 2009/0181147 A1 | 7/2009 | DeStafeno | |
| 2009/0181174 A1* | 7/2009 | Yoshihara | H01L 21/6715 427/314 |
| 2009/0214752 A1* | 8/2009 | Nielsen | A23L 17/70 426/643 |
| 2009/0246343 A1* | 10/2009 | Wu | A23L 5/48 426/540 |
| 2012/0100276 A1* | 4/2012 | Esteve | A23L 27/80 426/549 |

OTHER PUBLICATIONS

NPL Masaru et al. ([English translation of JP 2007/061023A]. (Year: 2007).*
NPL Yongqiang et al. [English translation of CN 1476779 (A) Feb. 25, 2004]. (Year: 2004).*
NPL Spensley et al. (in eatingRules, published Oct. 31, 2011) (Year: 2011).*
Google search for NPL Spensley et al. (See p. 2 third reference, Retrieved on Apr. 22, 2022). (Year: 2022).*
Hardman et al., "Adzuki Bean", in Corn Agronomy, Nov. 1989, pp. 1-3.
Matahira et al. JP 2009/062336 (English translation of Abstract). (Year: 2009).

* cited by examiner

*Primary Examiner* — Donald R Spamer
*Assistant Examiner* — Bhaskar Mukhopadhyay
(74) *Attorney, Agent, or Firm* — K&L Gates LLP

(57) ABSTRACT

A product includes simulated bacon slices containing, as ingredients, (i) a mixture of Adzuki beans, liquid smoke and water, (ii) a mixture of buckwheat groats, water and liquid smoke, and (iii) wheat gluten flour; and a topping sauce containing mixed bacon seasoning, coconut oil and liquid smoke. The simulated bacon slices with the topping sauce are packaged and labeled as a simulated bacon product.

7 Claims, 10 Drawing Sheets

SEITAN BACON PRODUCT

CROSS-REFERENCE TO RELATED DOCUMENTS

This application is a continuation of U.S. patent application Ser. No. 15/285,246 filed Oct. 4, 2016, which is a divisional of U.S. patent application Ser. No. 14/558,045 filed Dec. 2, 2014, which claims priority to U.S. Provisional Patent Appl. No. 62/066,090 filed Oct. 20, 2014. The entire contents of the above-referenced applications are hereby expressly incorporated herein by reference.

BACKGROUND OF THE INVENTION

Field of the Invention

The present invention is in the technical field of food products and food processing and pertains particularly to methods and apparatus for creating a simulated bacon product, and the product itself.

Discussion of the State of the Art

It is well-known that pork bacon is a staple of foodstuff and a staple of breakfast menus in America and other cultures as well. It is also well-known that pork bacon is fatty and rather high in calorie count. Further there is a well-established movement in commercial enterprises to create meat products that actually contain little or no meat at all, but rather are made primarily from vegetable and grain ingredients. The skilled person will be aware, for example, of veggie burgers, and of other pseudo-meat products.

But it is also true that many such products that simulate meat but are actually predominantly vegetable or grain, or both, most usually fail to accomplish the real taste and texture of the meat products they are meant to imitate or replace. There is, therefore, still an unmet need for a product made from vegetable and/or grain matter that approaches the real texture and taste of pork bacon. The present inventors have developed just such a product, through long scientific study and experiment, and thorough creation of many versions, each better than the last, arriving finally at products made from ingredients and in a process taught in considerable detail below in different embodiments. The inventors are quite sure that the processes taught in that document with the ingredients listed in the proportions listed, and the resulting product are unique and not obvious over any such product and process existing in the public domain at the time of filing the present patent application.

SUMMARY

In one embodiment of the invention a process for making a simulated bacon product is provided, comprising: (1) mixing dry ingredients for bacon seasoning in a container, and storing the mixed ingredients; (2) mixing adzucki beans, liquid smoke and water, and storing the mixture; (3) mixing buckwheat groats, water and liquid smoke, and storing the mixture; (4) processing the mixture from step (2) to a smooth texture, and storing the processed mixture; (5) processing the mixture from step (3) to a smooth texture, and storing the processed mixture; (6) combining the processed mixtures from steps (4) and (5), adding additional wet ingredients, blending, and storing for later use; (7) preparing a topping sauce by adding liquid smoke and olive oil to dry ingredients including bacon seasoning; (8) adding mixture from step (6) to dry ingredients including at least wheat gluten flour, mix to dough; (9) separating dough into loaves of a predetermined size, and placing the loaves into individual cooking baskets, and baskets into cooking skillets, then cooking for a predetermined time and temperature; (10) placing loaves into slicer, and slicing into bacon strips; (11) adding topping sauce from step (7) to bacon slices; and (12) packaging and labeling slices for distribution and sale.

In one embodiment in step (1) the ingredients comprise garlic granules, onion powder, tomato powder, smoked paprika, chili powder, cumin, black pepper, powdered mustard, sage, rosemary, evaporated cane juice, and salt. Also in one embodiment, in step (6), the additional wet ingredients comprise nutritional yeast, soy sauce, tomato paste, maple syrup, apple cider vinegar, liquid hickory smoke and coconut oil. Also in one embodiment, in step (9), the loaves are shaped such that, when sliced, the slices will approximate length and width of bacon slices. And in one embodiment the order of predominance for ingredients is evaporated cane juice and smoked paprika in equal amounts, followed by tomato powder, garlic granules, and onion powder.

In another aspect of the invention a simulated bacon product is provided, comprising strips of simulated bacon cut from a loaf prepared by mixing dry ingredients for bacon seasoning in a container, and storing the mixed ingredients, mixing adzucki beans, liquid smoke and water, and storing the mixture, mixing buckwheat groats, water and liquid smoke, and storing the mixture, processing the adzucki bean mixture to a smooth texture, and storing the processed mixture, processing the buckwheat groats mixture to a smooth texture, and storing the processed mixture, combining the processed adzucki bean and groats mixtures and adding additional wet ingredients, blending, and storing for later use, preparing a topping sauce by adding liquid smoke and olive oil to dry ingredients including bacon seasoning, adding the mixture of the processed beans and groats mixtures to dry ingredients including at least wheat gluten flour, and mixing to a to dough texture, separating the dough into loaves of a predetermined size, and placing the loaves into individual cooking baskets, and baskets into cooking skillets, then cooking for a predetermined time and temperature, placing the loaves into a slicer, and slicing into bacon strips, adding the topping sauce to the bacon slices, and packaging and labeling the slices for distribution and sale.

In one embodiment of the simulated bacon product the ingredients for the bacon seasoning comprise garlic granules, onion powder, tomato powder, smoked paprika, chili powder, cumin, black pepper, powdered mustard, sage, rosemary, evaporated cane juice, and salt. Also in one embodiment the additional wet ingredients comprise nutritional yeast, soy sauce, tomato paste, maple syrup, apple cider vinegar, liquid hickory smoke and coconut oil. Also in one embodiment the loaves are shaped such that, when sliced, the slices will approximate length and width of bacon slices. And in one embodiment the order of predominance for ingredients is evaporated cane juice and smoked paprika in equal amounts, followed by tomato powder, garlic granules, and onion powder.

DETAILED DESCRIPTION

The inventors teach a manufacturing process and ingredients for preparing a simulated bacon product for public consumption. The present invention is described in enabling detail using the following examples, which may describe more than one relevant embodiment falling within the scope of the present invention. The simulated bacon product is formed into a loaf and cooked before slicing and packaging the product to simulate real sliced and cured bacon.

Figure 1:
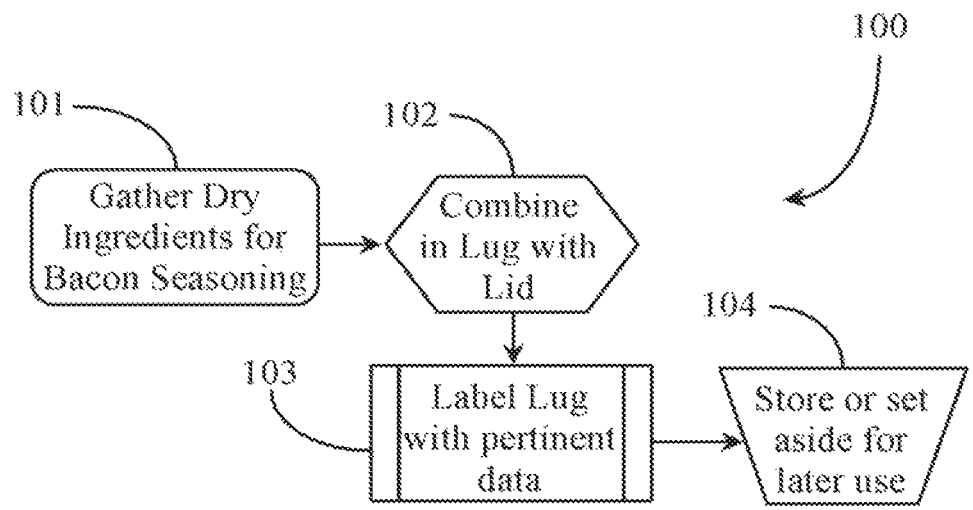
FIG. 1 is a process flow chart depicting steps for preparing bacon seasoning used in a sliceable bacon product.

One aspect of preparing the simulated bacon product includes preparation of a bacon seasoning. FIG. 1 is a process flow chart 100 depicting steps for preparing bacon seasoning used in a sliceable bacon product according to an embodiment of the present invention. The bacon seasoning includes an assortment of dry ingredients that may be gathered together at step 101. The ingredients may include, but are not limited to garlic granules, onion powder, tomato powder, smoked paprika, chili powder, cumin, black pepper, powdered mustard, sage, rosemary, evaporated cane juice, and salt.

The dry ingredients for the bacon seasoning are combined in a container termed by the inventors a food lug at step 102. The food lug in one embodiment has a length, width, and a depth, and has a lid to secure the combined contents. In one embodiment the ingredients are mixed by hand using a whisk or other mixing implement for dry ingredients. IN other embodiments the mixing may be by a powered mechanical device. The exact dimensions of the lug may vary depending upon the batch size of the bacon product for which the seasoning is being prepared.

The lug in one embodiment is labeled in step 103 with pertinent data identifying the contents, the date and time the contents were placed in the lug, and a lot code associating the lug with other lugs carrying other ingredients. At step 104 the ingredients are set aside or stored in a dry storage for later use in preparing the simulated bacon product. The exact amount of each dry ingredient used in the bacon seasoning may vary considerably. The dominant ingredients with respect to ratio of the whole include evaporated cane juice, smoked paprika (equal amounts) followed by tomato powder, garlic granules, and onion powder.

Figure 2:
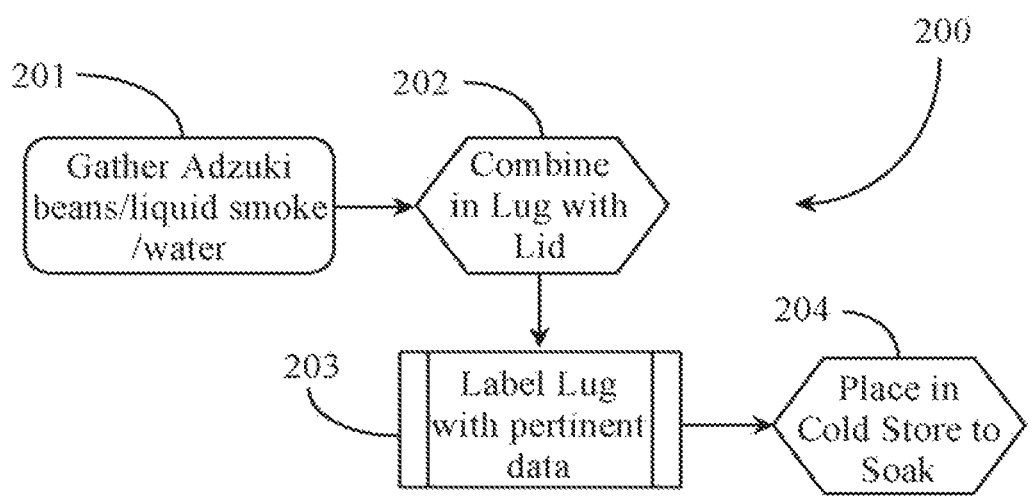
FIG. 2 is a process flow chart depicting steps for pre-soaking adzuki beans used in a bacon base in the sliceable bacon product.

One aspect of preparing a simulated bacon product includes preparation of a bacon base having adzuki beans as a prominent ingredient. FIG. 2 is a process flow chart 200 depicting steps for pre-soaking adzuki beans used in the bacon base in the sliceable bacon product in one embodiment. The adzuki beans are gathered and washed and liquid smoke and water are rendered available in step 201. The adzuki beans are combined with the liquid smoke and water mixture in a second food lug with lid at step 202. At step 203 the lug is labeled with pertinent data including lot code, product identification (marinating adzuki beans), and date and time product was placed into the lug. At step 204 the lug is placed in a cold storage, such as a refrigerator unit, to marinate for a period of time. The time allotted for this process is approximately 24 hours but may be more or less than 24 hours without departing from the spirit and scope of the present invention.

Figure 3:
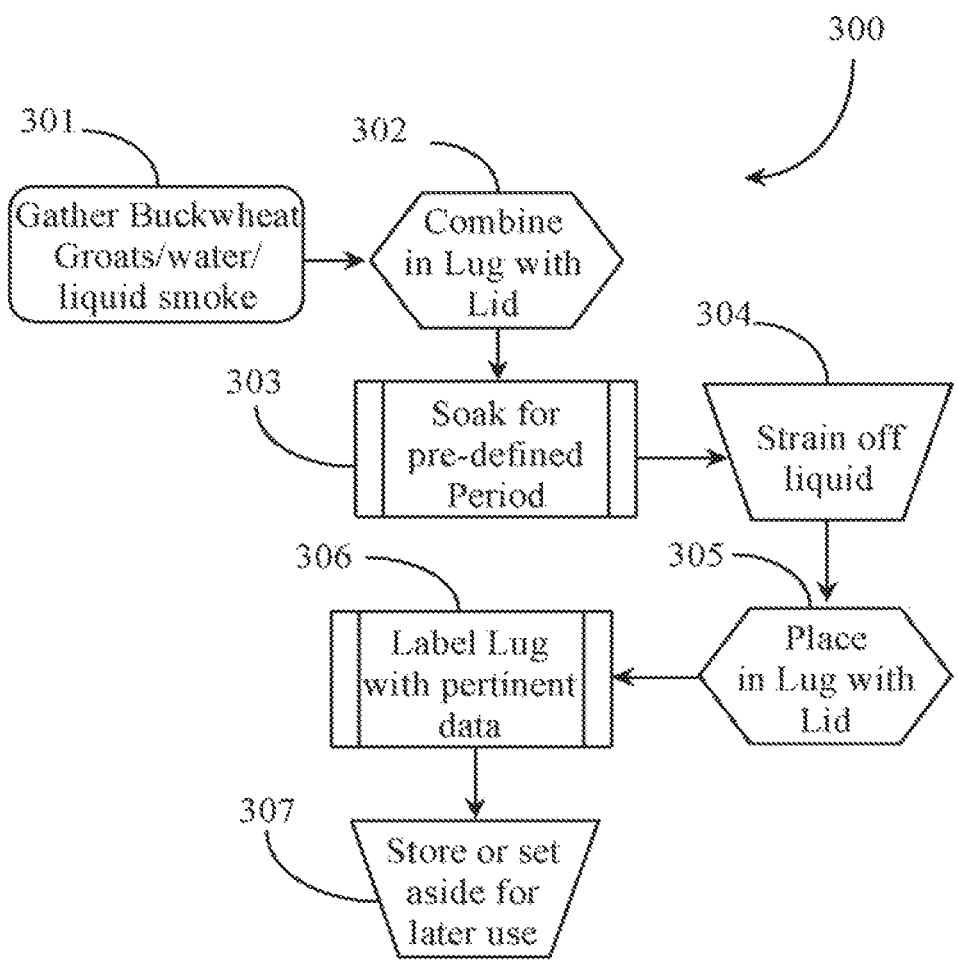
FIG. 3 is a process flow chart depicting steps for pre-soaking groats used in the bacon base in the sliceable bacon product.

One aspect of preparing the simulated bacon product includes preparation of groats used in the bacon bean base. FIG. 3 is a process flow chart 300 depicting steps for pre-soaking groats used in the bacon base in the sliceable bacon product. At step 301 buckwheat groats are obtained along with liquid smoke and a source of water. At step 302, the groats are combined with the liquid smoke and water in a third food lug. At step 303 the groats are soaked in the water and liquid smoke mixture for a pre-defined period of time. An exemplary soaking time for the groats may be approximately four hours, but this time may vary in different embodiments.

After soaking the liquid is strained off of the groats at step 304. The groats are placed in a fourth food lug with lid at step 305. At step 306 the lug is labeled with pertinent data including lot code, product identification (soaked groats), and date and time product was placed into the lug. At step 307 the groats are stored or set aside in cold storage for later use. Groats must be retrieved from storage and used within five days of refrigerated storage. The adzuki beans described further above and the groats are in one embodiment the primary ingredients of the adzuki bean bacon base. Together they make up more than sixty percent of the bacon base mixture.

Figure 4:
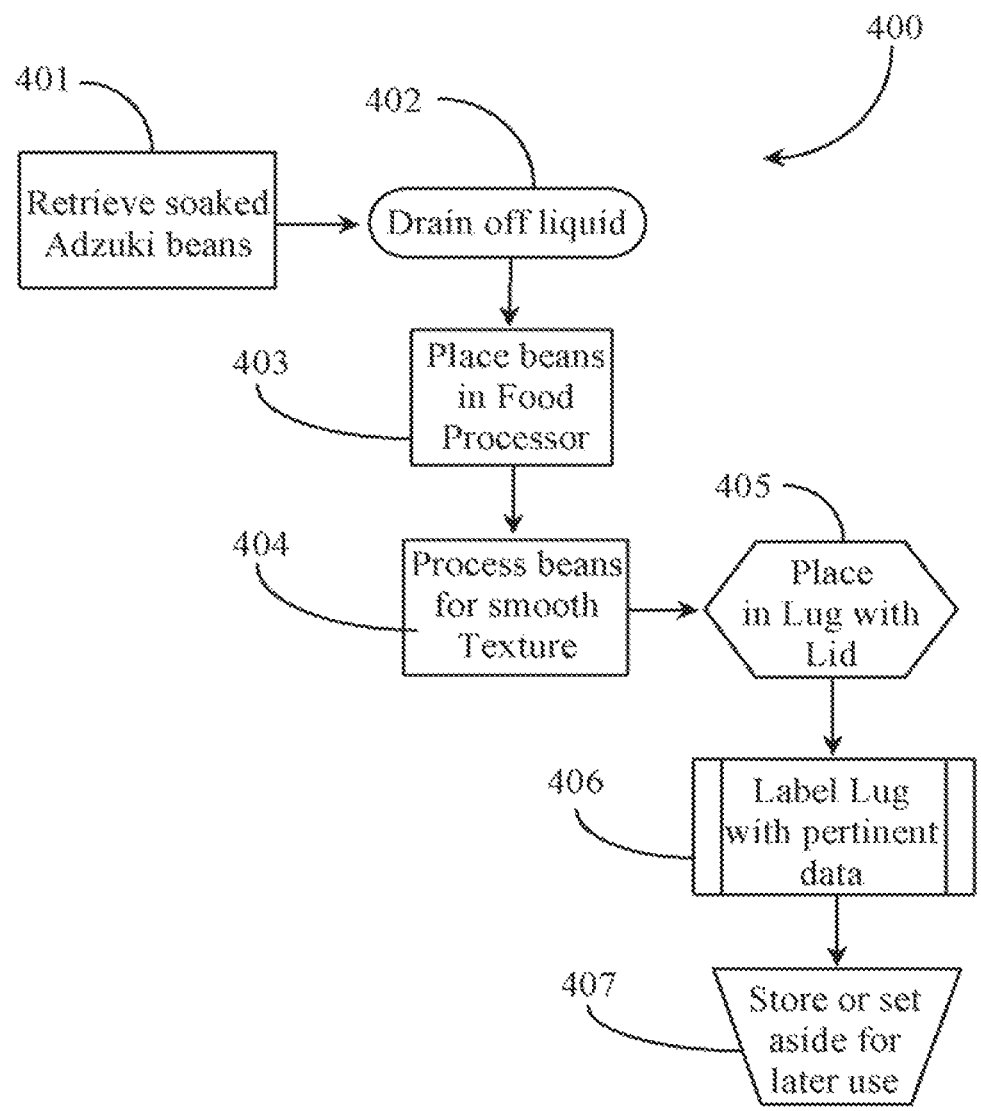
FIG. 4 is a process flow chart depicting steps for processing the adzuki beans into a smooth texture.

FIG. 4 is a process flow chart 400 depicting steps for processing the adzuki bean mixture stored with reference to FIG. 2 above into a smooth texture. At step 401, the adzuki beans may be retrieved from refrigerated storage. At step 402 the liquid is drained off of the adzuki beans. At step 403, the beans may be placed in a food processing unit such as a Hobart food processor. At step 404 the beans may be processed in the food processor until a smooth texture similar to a paste is achieved with minimal lumping. The processed beans may be placed in a fifth lug with a lid at step 405. At step 406 the lug is labeled with pertinent data including lot code, product identification (processed adzuki beans), and date and time product was placed into the lug. At step 407, the processed adzuki beans are placed back in cold storage such as a refrigerator unit for storage until later use.

Figure 5:
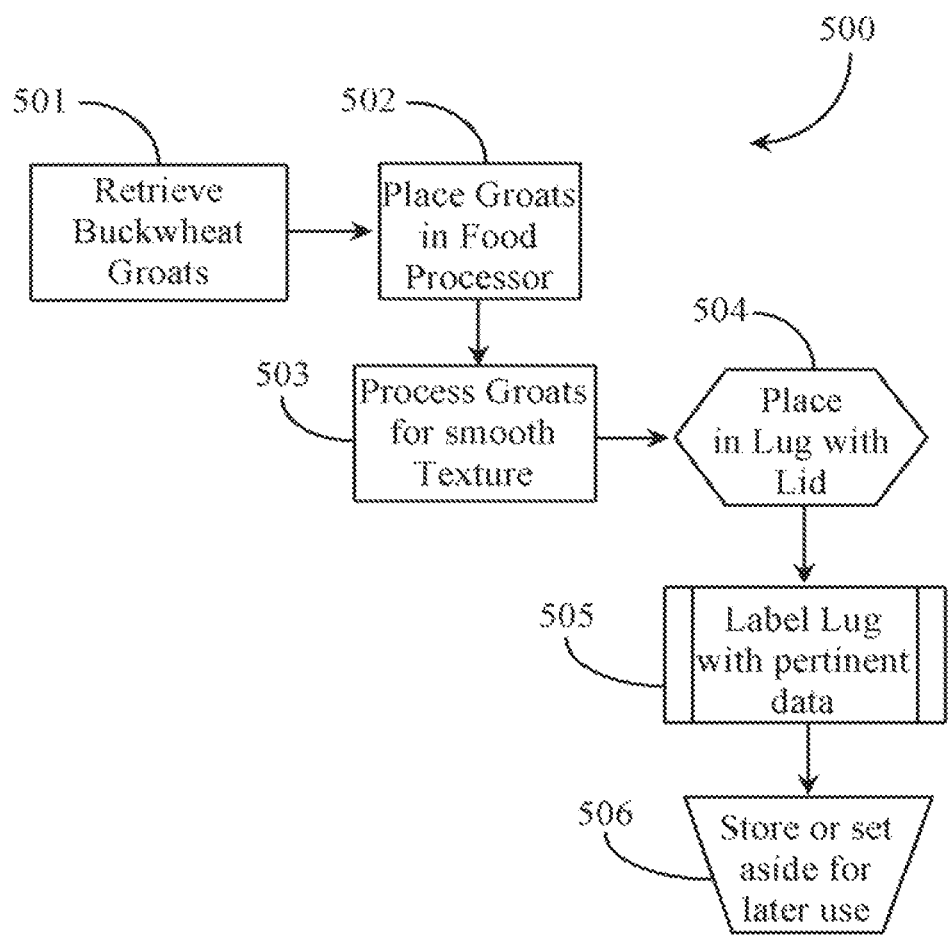
FIG. 5 is a process flow chart depicting steps for processing the groats into a smooth texture.

FIG. 5 is a process flow chart 500 depicting steps for processing the groats into a smooth texture. At step 501, the refrigerated groats are retrieved. At step 502 the groats are placed in a food processor such as the Hobart food processer mentioned further above. At step 503, the groats are processed for a smooth texture similar to a paste like Humus for example. At step 504 the groats may be placed in a sixth lug with lid. At step 505 the sixth lug is labeled with pertinent data including lot code, product identification (processed groats), and date and time product was placed into the lug. At step 506 the groats are placed back into refrigerated storage, or are set aside for later use.

Figure 6:
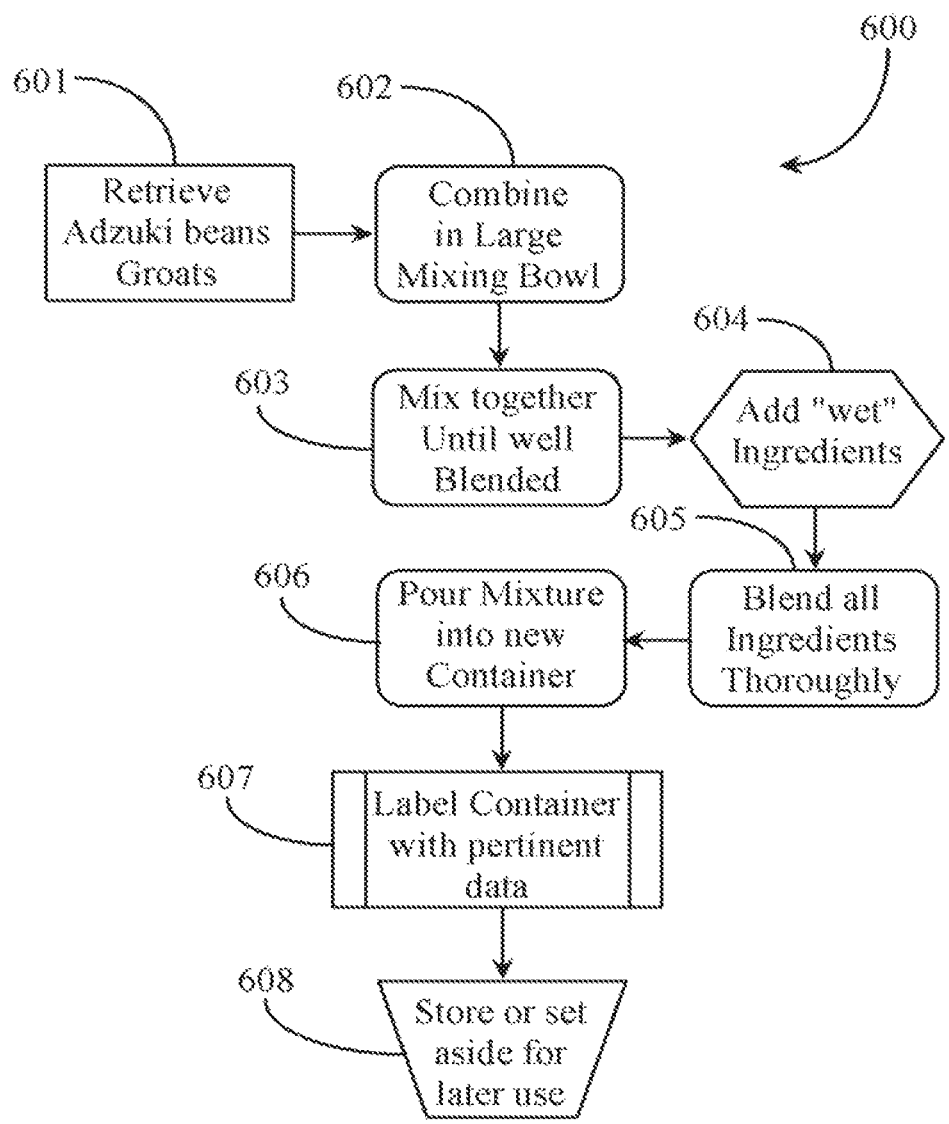
FIG. 6 is a process flow chart depicting steps for preparing the bacon base.

FIG. 6 is a process flow chart 600 depicting steps for preparing the bacon base. At step 601 processed adzuki beans and groats are retrieved from cold storage in preparation for mixing the bacon base used in the sliceable bacon product. In addition to the primary base ingredients (adzuki beans, groats), the bacon base may include onion powder, nutritional yeast, smoked paprika, soy sauce, salt, tomato paste, coconut oil, maple syrup, apple cider vinegar, and hickory smoke. The processed beans and groats are placed in a large mixing bowl at step 602. The capacity of the bowl may vary according to batch size without departing from the spirit and scope of the present invention. In this example an 80 quart bowl is used in conjunction with a Hobart mixer. At step 603 the processed foods are mixed together with the mixer until well blended.

Other bean/bacon base ingredients may be added to the blend at step 604. In one implementation the added ingredients may include nutritional yeast, soy sauce, tomato paste, maple syrup, apple cider vinegar, and liquid hickory smoke. In this implementation the ingredients also include coconut oil. The coconut oil may have to be warmed to a liquid before adding to the mixture. In one implementation smoked paprika, salt, and onion powder might be added in small amounts for seasoning. In another implementation, no seasoning is added to the blended mixture. At step 605, the ingredients are all blended together with the groats and beans using the Hobart mixer unit or similar implement to make the blended bacon base. At step 606 the blended mixture may be poured into a container with lid. The capacity of the container for storing the blended bacon base may vary according to batch size. In this example, the container is a 20 quart container. At step 607 the container is labeled with pertinent data including lot code, product identification (blended bacon base), and date and time the product was placed into the container. At step 608 the blended bacon base is set aside in cold storage for latter use in preparation of the simulated bacon product.

Figure 7:
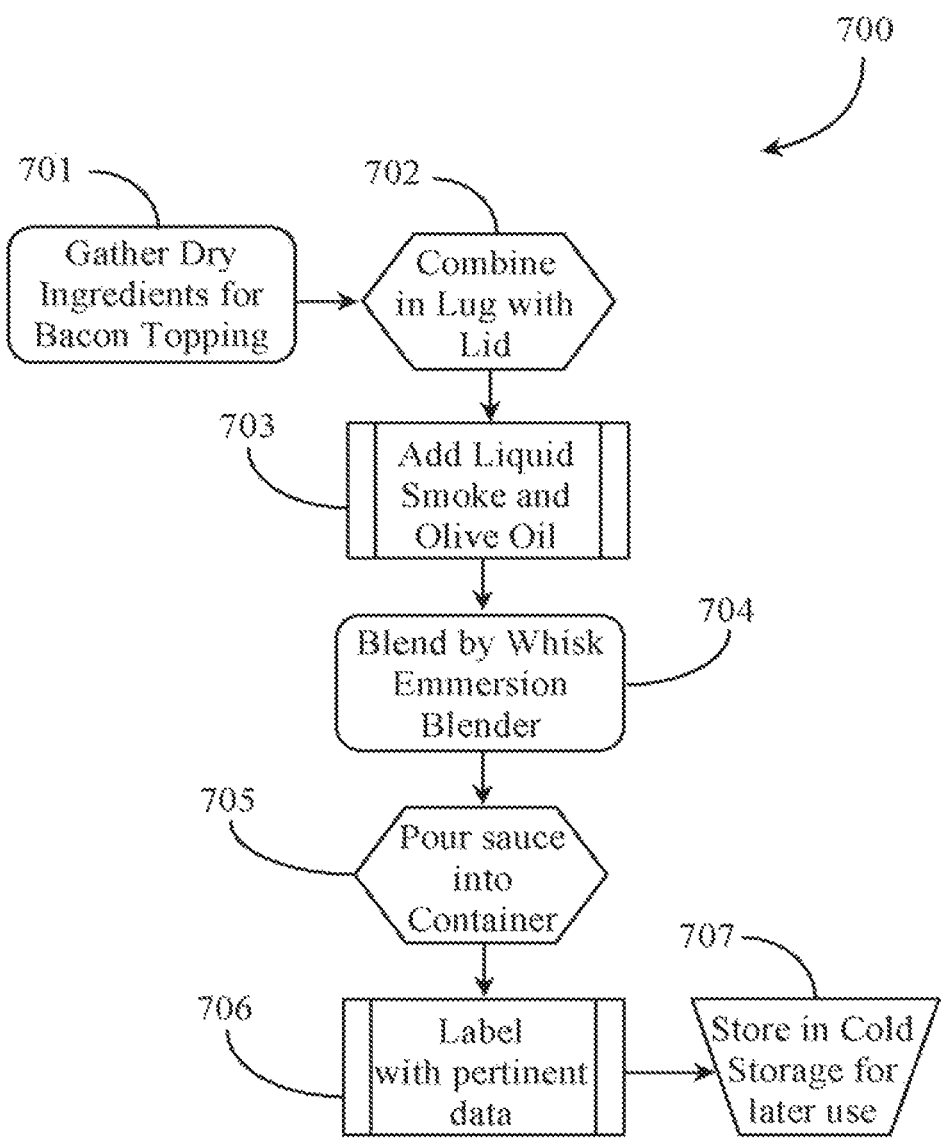
FIG. 7 is a process flow chart depicting steps for preparing bacon topping sauce.

One aspect of preparing the simulated bacon product includes preparation of a bacon topping sauce used on the simulated bacon product. FIG. 7 is a process flow chart 700 depicting steps for preparing the bacon topping sauce. Ingredients for the bacon topping sauce in one embodiment include bacon powder, bacon seasoning, salt, olive oil, and liquid hickory smoke. Dry ingredients used in the process are gathered at step 701. The dry ingredients are combined in a seventh food lug with lid at step 702. Liquid smoke and olive oil may be added to the dry ingredients at step 703. The ingredients may be combined at step 704 using a whisk and emersion blender.

In one implementation for a larger batch, the ingredients may be blended first with a whisk in the food lug. The mixture may then be transferred to a Hobart 80-quart mixing bowl where the sauce is mixed using a Hobart mixer for the following speed/times: speed 1 for 1 minute, speed 2 for 2 minutes and speed 3 for 3 minutes. Capacities of mixing bowls and mixing speeds and times may vary according to batch size and ambient conditions. In one implementation the bacon topping sauce may be re-combined before use with an emersion blender. If mixed sauce has been refrigerated, it must be remixed using either the Hobart mixer or emersion blender prior to use. The sauce may be set out from refrigerated storage for approximately 20 minutes prior to mixing with emersion blender.

The bacon topping sauce may be poured into a sauce container at step 705. The container may be labeled in step 706 with pertinent data such as lot code, product identification (bacon topping sauce), and date and time the product was placed into the container. The container of sauce may be placed in cold storage such as a refrigeration unit for later use.

Figure 8:
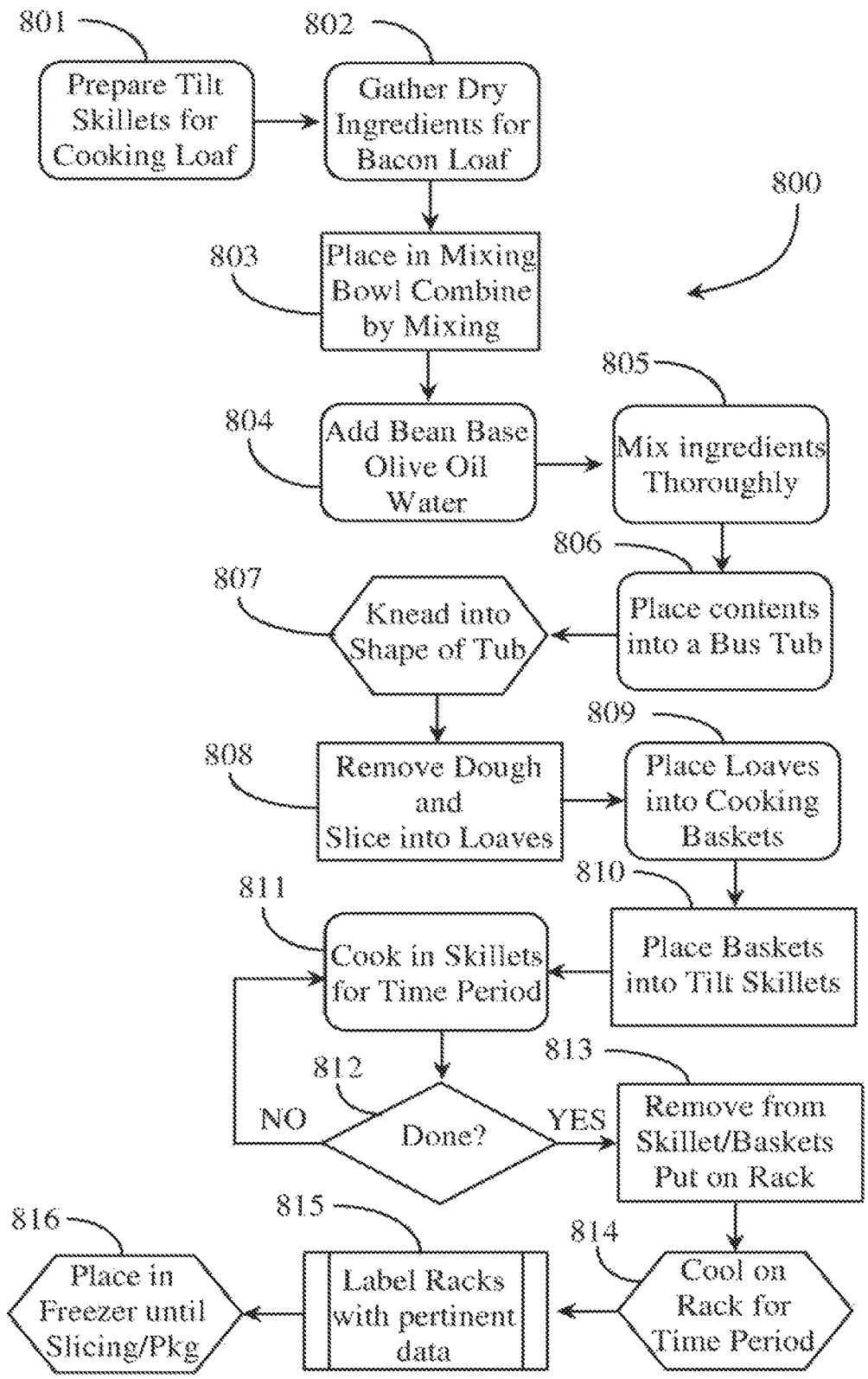
FIG. 8 is a process flow chart depicting steps for preparing bacon loaves.

One aspect of preparing the simulated bacon product includes preparation of a bacon loaf that may be sliced into bacon strips. FIG. 8 is a process flow chart 800 depicting steps for preparing bacon loaves. Ingredients for the bacon loaf include vital wheat gluten (seitan), water, the adzuki bean/bacon base (FIG. 6), the bacon seasoning (FIG. 1), annatto, olive oil, and bacon powder. In one implementation the bacon loafs are cooked in tilt skillets for industrial use.

The tilt skillets may be prepared for cooking a batch of simulated bacon loaves at step 801. Preparation in this regard includes combining water, liquid hickory smoke, and caramelized sugar in as many skillets as needed to process a batch of bacon loaves. At step 802 the dry ingredients for the simulated bacon loaf are gathered. The dry ingredients (vital wheat gluten flour, Bacon seasoning, bacon flavor powder, and annatto) are placed in a large mixing bowl such as a Hobart mixing bowl described previously and are combined together by mixing.

The adzuki bean base, olive oil and water may be added to the mixing bowl containing the dry ingredients at step 804. At step 805 the ingredients are mixed thoroughly. In this example the mixing speed may be low speed for one to two minutes and medium speed for approximately two minutes. At step 806 the contents are placed into a bus tub. The contents are kneaded into a dough at step 807 in the bus tub the mixture assuming the shape of the bus tub. The top of the loaves are flattened if necessary to promote uniform thickness dimensioning of each loaf. This is a step influencing the size of bacon strips to be later sliced from the loaf.

The dough may be separated into individual loaves at step 808. In this example a pre-cooked loaf measures approximately six inches wide by 8 inches long by 1.5 inches thickness. Each loaf may weighs approximately 2.2 pounds. This is not a limitation of the invention but a variable that influences size of slices for bacon product. The individual loaves may be placed into individual cooking baskets designed to be used with the tilt skillets in step 809. At step 810 the baskets are placed into the tilt skillets.

In step 811 the loaves are cooked for a period of time. The cooking baskets may hold two loaves each in one implementation. A large batch may require as many as 25 to 30 cooking baskets for 50 or more loaves. The loaves are boiled for approximately 60 to 70 minutes. At step 812 the cooking may be monitored to determine if the loaves are sufficiently cooked or "done". If it is determined that they are not through cooking, the process might resolve back to step 811 until next check. If it is determined at step 812 that the loaves are finished cooking the process moves to step 813.

At step 813 the loaves are removed from skillets and baskets and placed on screens and put on refrigeration racks. There might be 6 to 8 loaves per screen. The loaves are cooled in step 814 for a time period of approximately 20 minutes before cold storage. The loaded refrigeration racks may be covered with plastic and labeled with pertinent data in step 815. The data may include lot code, product name and date. The plastic cover may be perforated to provide ventilation. The product is placed into or wheeled (on rolling racks) into a freezer unit at step 816 until slicing time. It is noted herein that the simulated bacon loaves may be sliced optimally when they have cooled to approximately 32 degrees.

Figure 9:
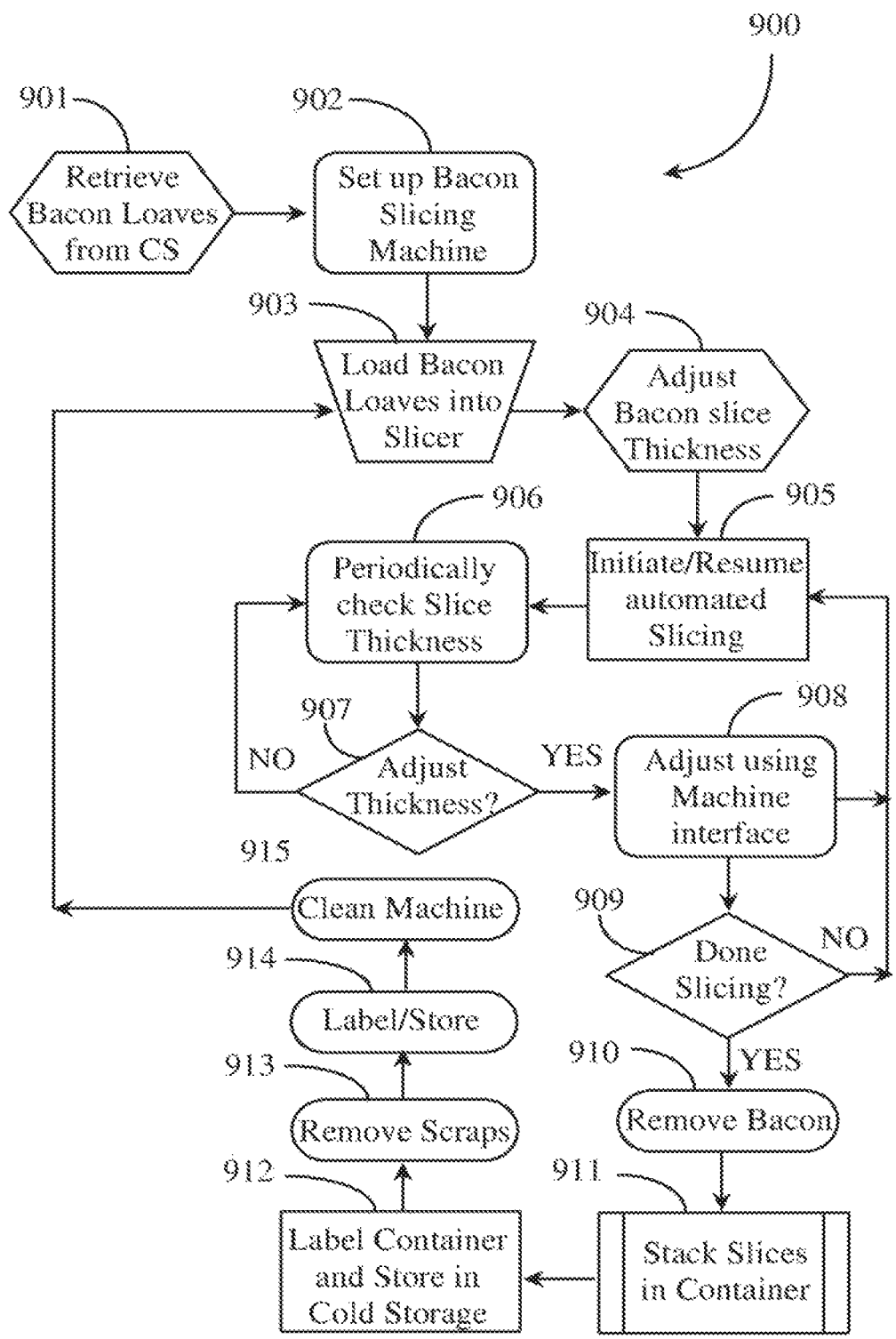
FIG. 9 is a process flow chart depicting steps for slicing bacon strips from bacon loaves.

FIG. 9 is a process flow chart 900 depicting steps for slicing bacon strips from bacon loaves. At step 901 bacon loaves previously placed on racks in cold storage are retrieved and allowed to warm up to approximately 32 degrees before slicing, if they are colder than the optimum temperature. 32 degrees F. represent a "goldilocks" temperature for slicing. If bacon loaves reach 38 degrees F. they are to warm to maintain accurate thickness at slicing. In one implementation the loaves are sliced using a computer numerical control (CNC)-enabled industrial slicer machine like a Grote slicing machine for example, having loading cartridges and a material entry chute.

The slicing machine is set up for bacon slicing at step 902. In this implementation using an industrial slicing machine, the bacon loaves are wheeled over to the slicer on half speed racks from cold storage. Up to four loaves are auto-loaded into one bacon cartridge numerically controlled, automated slicing. In one implementation a new slicing blade is installed before starting slicing of a new batch. The machine may also be sanitized as required before starting slicing operations. Bacon loaves, cooled to approximately 32 degrees Fahrenheit, are loaded into the slicing machine at step 903. If loaves are too wide to fit in the loading chute, the sides of the loaves may be trimmed to fit. Each bacon cartridge will hold up to four bacon loaves for slicing. At minimum, each cartridge should be loaded with three bacon loaves for slicing for even weight distribution and slicing consistency relative to dimensioning.

The desired thickness of a sliced strip of bacon may be pre-programmed using a computer interface associated with the slicing machine at step 904. Slicing may be initiated at step 905. Loading of more loaves into the slicer may be performed on prompt by the machine as bacon is sliced and removed from cartridges. Slicing thickness of sliced strips of simulated bacon may be checked periodically in step 906 using normal quality control (QC) checks while the product is processed. In one implementation, QC on slice thickness is performed every few minutes during active automated slicing. A user/operator may determine whether or not to make a slicing thickness adjustment on the machine in step 907 based on the last QC check of slice thickness. In one implementation this process may be somewhat or fully automated depending upon machine capabilities and features.

If the user or operator determines not to adjust the thickness, the process may resolve back to step 906 until the user makes a determination to adjust the thickness setting or until the product is finished. If the user determines to adjust the slicing thickness at the machine interface in step 907 the adjustment may be implemented at step 908. If the product is not finished, the process resumes automated slicing at step 905. An industrial slicer may use water as a slicing blade lubricant during slicing operations. Therefore water levels may also be periodically checked to ensure proper lubrication and minimal blade friction against the product. It is noted herein that steps for quality control and machine maintenance may be reduced or eliminated if the batch is small. For larger batches more QC and machine maintenance may be appropriate.

At step 909 the operator determines whether the product has been sliced (done slicing). If the process is not complete the process resolves back to step 905 for resumed slicing. If the user is finished slicing in step 909, the operator removes the rest of the bacon product from the cartridges at step 910. The individual simulated bacon slices may be stacked in a large container or one or more sanitized tubs in step 911. The tub of simulated bacon slices may be labeled with lot code, product identification (simulated bacon loaf slices), and date produced, and placed in cold storage (refrigeration/freezer unit) at step 912 until packaging is required.

In one implementation, any bacon scraps are removed from the slicing machine at step 913 approximated every 30 minutes for large batch processing. The scraps might be labeled and stored in a freezer unit for latter disposition in step 914. The slicing machine may be cleaned thoroughly in step 914 in preparation for another run of the same or different product which may occur as the process resolves back to step 903 if another product run is required for the same product. Otherwise the process ends for that batch after step 915.

Figure 10:
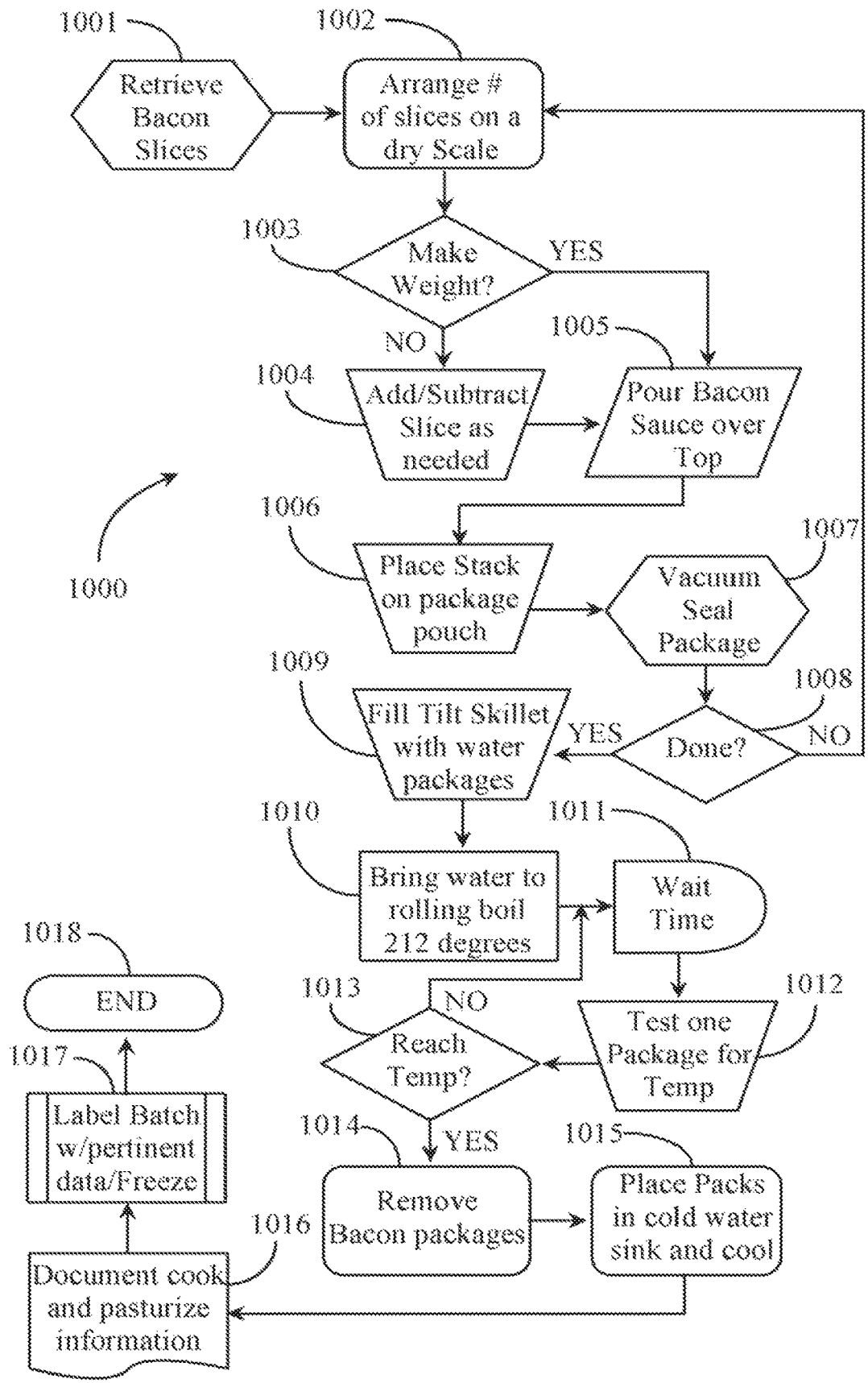
FIG. 10 is a process flow chart depicting steps for packaging and sterilizing bacon strips.

FIG. 10 is a process flow chart 1000 depicting steps for packaging and sterilizing bacon strips. At step 1001 sliced simulated bacon may be removed from cold storage to undergo packaging. A predetermined number of simulated bacon slices are arranged in shingle fashion (edges overlapping) on a weighing scale in step 1002. In a preferred embodiment minimum weight for bacon slices should be about 17 grams while maximum weight should be about 19 grams.

In step 1003 it is determined whether the arranged stack of bacon slices makes the nominal weight (within weight tolerance). If it is determined that the product weighs correctly at step 1003, a measured amount of bacon sauce in poured over the top of the shingled stack of slices in step 1005. If it is determined at step 1003 that the product is too light or heavy, the operator may add or remove a slice to make the required weight at step 1004. The process then moves to step 1005 for the bacon sauce application. The measure of bacon sauce is approximately one half ounce.

It is noted herein that ideal weight is approximately 18 grams for a single bacon slice. The exact number of bacon slices arranged in shingle fashion on the scale depends upon collective weight of shingled stack. For example, a minimum weight for 8 slices may be 136 grams while a maximum weight for the same may be about 152 grams. 144 grams is the ideal or nominal weight for a stack of simulated bacon slices. A slice may be added or subtracted from a shingled stack to adjust the overall weight while the product is scaled. At this point a small amount of the topping sauce may be added.

The stack of bacon is placed, if not already, on a vacuum package (pouch) for vacuum packaging in step 1006. At step 1007 the packaged is vacuum sealed. Steps 1001 through 1007 may be performed in a looped fashion until all of the bacon slices are in vacuum packages. A step 1008 is determined if the process up to vacuum packaging is complete. If it is not complete at step 1008 the process resolves back to step 1002. If vacuum packaging is complete, the packages are once again placed in tilt skillets filled with water (used also for cooking) for pasteurization at step 1009.

The water in the tilt skillet(s) is brought to a rolling boil of 212 degrees with the packages submersed in the skillets at step 1010. The packages are left in a boiling state at step 1011 for a pasteurization period of approximately 4 minutes (time may vary according to different lot sizes). In step 1012, a package may be removed from a tilt skillet and tested for temperature. This might be performed by puncturing the package with a thermometer capable instrument.

It is determined at step 1013 whether the product inside the package has reached an acceptable temperature for pasteurization. An acceptable temperature in this example is approximately 180 degrees F. If the product tested at or above the right temperature in step 1013, the packages of simulated bacon slices may be removed from the associated tilt skillet at step 1014. If the tested package does not make the temperature requirement in step 1013, the process may resolve back to step 1011 for added wait time.

Packages that have passed the pasteurization process are placed in cold water sinks to cool down at step 1015. At step 1016 the pasteurization and cooking information (times product amounts) may be documented for future quality control data. The cooled packages of simulated bacon may be organized by batch on trays and may be labeled with the pertinent data including lot number, product identification, cook date, pasteurization data, etc. and placed in a freezer unit until shipping is required in step 1017. Much of the data may be transferred from the rack label information. The process may end for that batch of product in step 1018.

It is noted herein that appropriate quality control measures, such as inspecting packages for seal defects, before and after pasteurization may be performed as may be required. In one implementation the pasteurized packages are cooled down to approximately 41 degrees F. within a certain period of time such as 5 hours. Exact time might vary according to load. In one implementation the pasteurized simulated bacon product may be flash frozen if same day shipping is required. Post pasteurization package cooling information is also documented in step 1017. Any packages with loose packaging/air are to be set aside in lugs, labeled for REPACK with Lot code, date, what the product identification, and placed in a refrigerator unit for repackaging.

Figure 11:
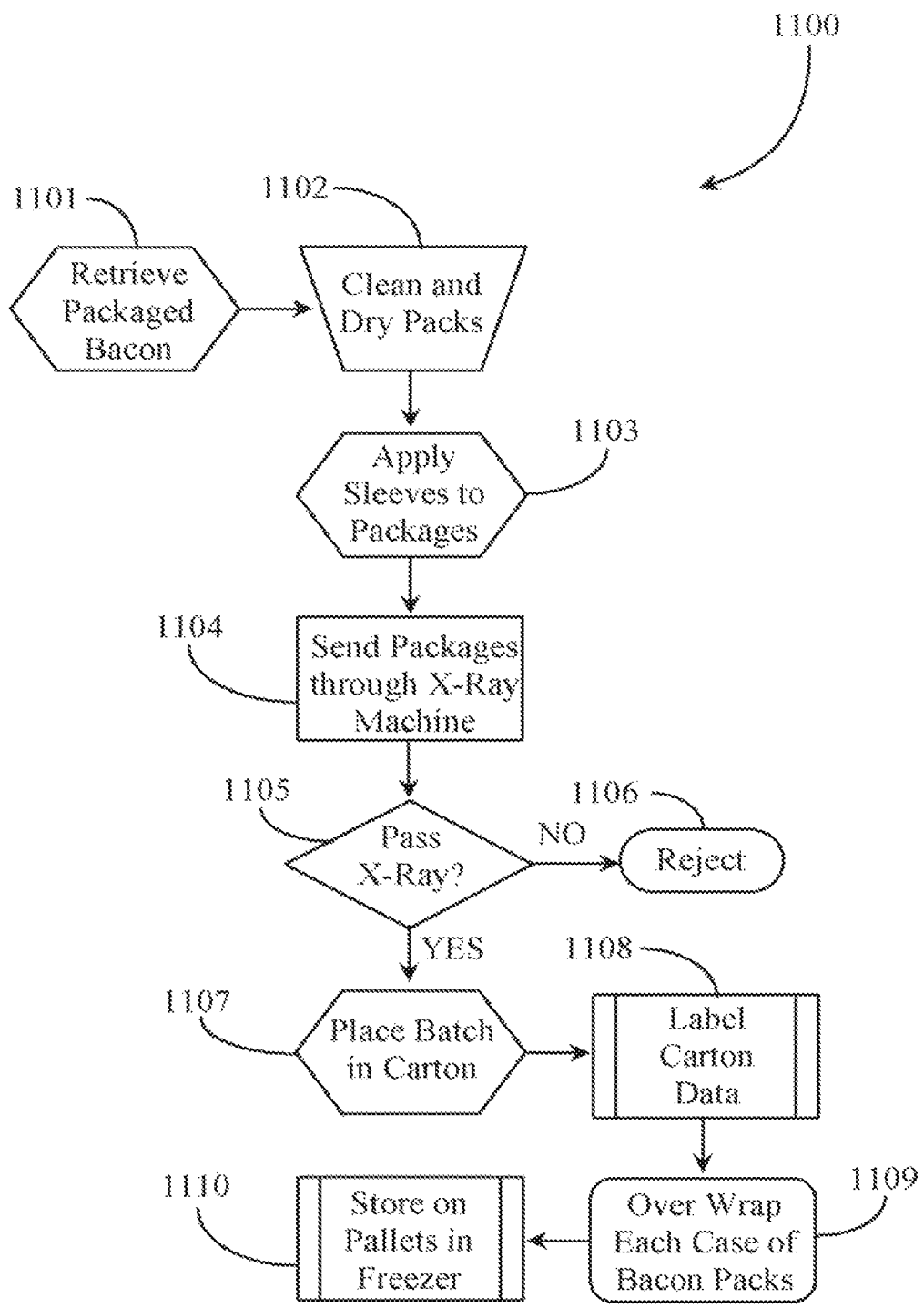
FIG. 11 is a process flow chart depicting steps for quality control scanning bacon strip packages and final packaging of multiple single packages for latter shipment.

FIG. 11 is a process flow chart 1100 depicting steps for quality control scanning bacon strip packages and final packaging of multiple single packages for later shipment. Packaged bacon stored after pasteurization may be retrieved from cold storage in step 1101. The retrieved packages may be cleaned and dried off at step 1102 in preparation for final packaging.

In step 1103 sleeves are applied to each package. Sleeves are glued together using minimal glue and are pre-printed with "Best by Date" sticker. Stickers may also include the lot code, refrigeration data, and freeze data relative to product creation data. Sleeved packages may be sent through an X-Ray process (machine) to check packages for foreign objects. In one implementation the packages are again checked for final weight during the X-Ray process.

It is determined in step 1105 whether the packages pass or fail the X-Ray examination and weight check if applicable. If a package fails the process as determined in step 1105, the packages is rejected at step 1106. If a package passes the process as determined in step 1105, the passing batch of packaged product is placed in a shipping carton. The cartons are labeled with all of the pertinent information in step 1108. In step 1109 each carton or case of packaged product may be overwrapped with plastic and then placed in a freezer unit in step 1110 ready to ship. In one implementation, product-filled cases are placed on a conveyor with the front of the case facing left. Cases are conveyed across a Master Case Date Coder which prints the UPC code, Lot code, refrigeration date, frozen date and identification of product. Each case receives overwrap, is palletized and placed in cooler.

It will be apparent to one with skill in the art that the simulated bacon manufacturing process and product of the invention may be provided using some or all of the mentioned features and ingredients, and the processing may be done in different ways without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

It will also be apparent to the skilled person that the arrangement of elements and functionality for the invention is described in different embodiments in which each is exemplary of an implementation of the invention. These exemplary descriptions do not preclude other implementations and use cases not described in detail. The elements and functions may vary, as there are a variety of ways the hardware may be implemented and in which the processes may be provided within the scope of the invention. The invention is limited only by the breadth of the claims below.

The invention is claimed as follows:

1. A product comprising:
   simulated bacon slices consisting of, as ingredients, (i) a mixture of Adzuki beans, liquid smoke and water, (ii) a mixture of buckwheat groats, water and liquid smoke, (iii) wheat gluten flour, and (iv) one or more additional ingredients selected from the group consisting of onion powder, bacon flavor powder, nutritional yeast, smoked paprika, soy sauce, salt, tomato paste, coconut oil, maple syrup, apple cider vinegar, evaporated cane juice, annatto, tomato powder, and hickory smoke; and
   a topping sauce comprising mixed bacon seasoning, coconut oil and liquid smoke;
   the adzuki beans are blended throughout the simulated bacon slices, and
   the simulated bacon slices with the topping sauce are packaged and labeled as a simulated bacon product.

2. The product of claim 1, wherein the Adzuki beans and the buckwheat groats together comprise at least sixty percent by weight of the ingredients.

3. The product of claim 1, wherein the one or more additional ingredients in the simulated bacon slices comprise nutritional yeast.

4. The product of claim 1, wherein the topping sauce further comprises olive oil.

5. The product of claim 1, wherein the simulated bacon slices are made by a process comprising blending (i) the mixture of Adzuki beans, liquid smoke and water, (ii) the mixture of buckwheat groats, water and liquid smoke, and (iii) the wheat gluten flour together in a mixer to form a blended bacon base.

6. The product of claim 5, wherein the one or more additional ingredients in the simulated bacon slices comprise coconut oil, and the blended bacon base comprises the coconut oil.

7. The product of claim 1, wherein the topping sauce is made by a process comprising combining the mixed bacon seasoning, coconut oil and liquid smoke using at least one of a whisk, an emersion blender or a mixer.

* * * * *